United States Patent
Chiang

(10) Patent No.: US 7,673,951 B2
(45) Date of Patent: Mar. 9, 2010

(54) TRACK SHOE FOR CATERPILLAR VEHICLE

(75) Inventor: Chun-Li Chiang, Taichung (TW)

(73) Assignee: Everpads Co., Ltd., Taichung (TW)

( * ) Notice: Subject to any disclaimer, the term of this patent is extended or adjusted under 35 U.S.C. 154(b) by 0 days.

(21) Appl. No.: 12/081,877

(22) Filed: Apr. 23, 2008

(65) Prior Publication Data

US 2009/0267408 A1    Oct. 29, 2009

(51) Int. Cl.
*B62D 55/28*    (2006.01)
*E02F 9/28*    (2006.01)

(52) U.S. Cl. .................. 305/189; 305/162; 305/201

(58) Field of Classification Search ......... 305/160–162, 305/46, 51, 187, 189–191, 198, 200–201
See application file for complete search history.

(56) References Cited

U.S. PATENT DOCUMENTS

| | | | | |
|---|---|---|---|---|
| 2,458,755 A | * | 1/1949 | Waller | 305/197 |
| 2,686,697 A | * | 8/1954 | Baker | 305/161 |
| 3,231,316 A | * | 1/1966 | Ruf | 305/162 |
| 3,520,574 A | * | 7/1970 | Wiesner | 305/161 |
| 3,542,439 A | * | 11/1970 | Joos | 305/34 |
| 3,584,922 A | * | 6/1971 | Koemer et al. | 305/163 |
| 3,642,332 A | * | 2/1972 | Sinclair et al. | 305/162 |
| 4,444,441 A | * | 4/1984 | Parker | 305/204 |
| 4,461,516 A | * | 7/1984 | Lee | 305/161 |

* cited by examiner

*Primary Examiner*—Jason R Bellinger
(74) *Attorney, Agent, or Firm*—Rosenberg, Klein & Lee

(57) ABSTRACT

A track shoe fastened on a chain of the caterpillar vehicle includes a body and a buffer block. The body includes an first surface adjacent to the chain, a second surface opposite to the first surface, a third surface, a fourth surface opposite to the third surface, a groove defined on the second surface and through the third surface and the fourth surface, and the holes defined through the first surface and the second surface to communicate with the groove. The buffer block includes an embedded portion capable of being embedded within the groove of the body, and multiple lock holes defined through the buffer block to respectively communicate with the holes of the body. The buffer block is secured on the body through the embedment between the embedded portion and the groove, and secured on the chain by the fastening members within the holes and the lock holes.

8 Claims, 6 Drawing Sheets

TRACK SHOE FOR CATERPILLAR VEHICLE

BACKGROUND

1. Field of Invention

The present invention relates to a track shoe, and more particularly to the track shoe for a caterpillar vehicle which can facilitate assembly process and reduce manufacture cost.

2. Description of Related Art

Conventional tracks are applied to various huge machines, such as excavators, road planers, asphalt pavers etc., for machinery movement, and mostly includes a rubber track shoe to extend the life thereof and to prevent the vehicle from making a large noise from direct between the wheels of the vehicle and the road. Moreover, the rubber track shoe can decrease the frictional resistance and absorb the vibration to drive the machine smoothly.

Refer to FIG. 1. FIG. 1 illustrates a perspective view of conventional track shoe for a paver. The track shoe 110 is located on the chain of various machines, and includes a metal plate 111, a support plate 112, and a rubber block 113. The rubber block 113 is combined with the metal plate 111 during the vulcanization molding process, and the support plate 112 located between the rubber block 113 and the metal plate 111 enhances the strength and the durability of the rubber block 113.

However, the rubber block 113 belongs to a consumptive cushion material, and needs to be replaced after predetermined abrasion occurs. The rubber block 113 cannot be demounted from the metal plate 111 such that both the metal plate and the rubber block need to be replaced simultaneously. Therefore, the metal plate 111 is wasted and the material cost is increased.

In order to solve this mentioned problem, the rubber block and the metal plate are currently manufactured separately and then combined with each other. Refer to FIG. 2. The discrete track shoe 120 includes a metal plate 121, a rubber block 122, multiple bolts 123, and multiple nuts 124.

Regarding the fabrication of the discrete track shoe 120, the bolts 123 are set through the first holes 1211 of the metal plate 121 to secure the metal plate 121 on the chain (not shown). Moreover, the bolts 125 are set through the chain and the second holes 1212 of the metal plate 121. The bolts 125 are secured with the nuts 124 embedded in the rubber block 122 thereby fastening the rubber block 122 on the metal plate 121.

In addition to the abovementioned discrete track shoe 120, there is also another discrete track shoe wherein the nuts are embedded within the rubber block during the vulcanization molding process such that the rubber block can be fastened on the metal plate through the engagement between the nuts and the bolts.

Although the discrete track shoe 120 can solve the rubber block replacement problem of the track shoe 110, the discrete track shoe 120 needs two assembly processes to be fastened on the chain. In this way, the assembly is complicated, and the cost is thereof raised because of the extra fastening members. Beside, the fastening members of the nuts and the bolts must be separated from the track shoe before the rubber block replacement to extend the replacement period and increase human cost.

SUMMARY

It is therefore an aspect to provide a track shoe of simple structure to facilitate assembly process.

In accordance with an embodiment of the present invention, the track shoe is fastened on a chain of the caterpillar vehicle, and includes a body and a buffer block.

The body is made of metal, and comprises a first surface, a second surface, a third surface, a fourth surface, a groove, and multiple holes. The first surface is defined adjacent to the chain, and the second surface is defined opposite to the first surface. The groove is defined on the second surface, and through the third surface and the fourth surface. The holes are defined through the first surface and the second surface to communicate with the groove.

The buffer block includes an embedded portion and multiple lock holes corresponding to the holes of the body. The embedded portion is capable of being embedded within the groove of the body. The lock holes are defined through the buffer block to respectively communicate with the holes of the body. Therefore, the buffer block is secured on the body through the embedment between the embedded portion and the groove, and the connected buffer block and the body are then secured on the chain through the bolt connection of the fastening members firmly located in the holes and the lock holes.

In addition, the groove of the body has an S-shaped formation in part, and the embedded portion has a reverse S-shaped formation in part complementary to the S-shaped formation of the groove thereby providing a firm connection.

As a result, the buffer block is embedded within the body through the elasticity thereof such that the assembly or the replacement can be operated more conveniently because of its simple structure. Furthermore, the assembly and replacement process are facilitated and the manufacture and material cost are accordingly reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
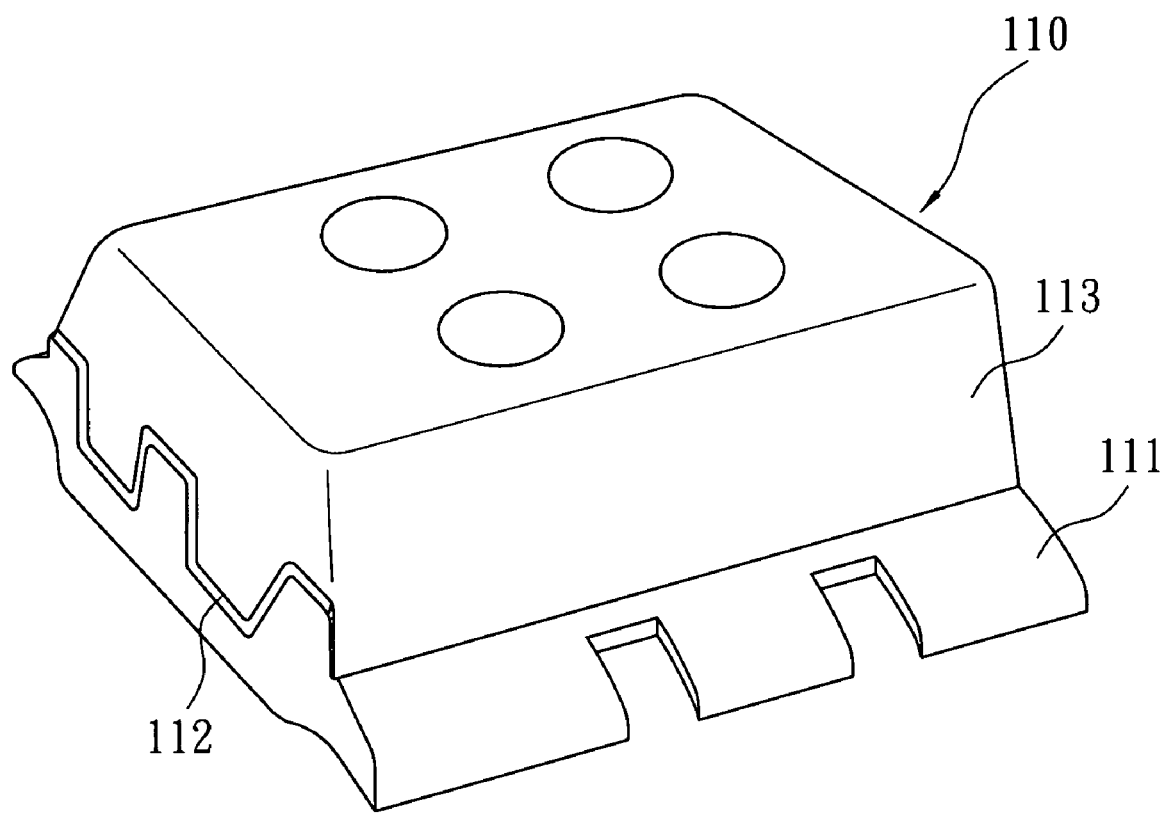
FIG. 1 is a perspective view of a conventional track shoe for a paver.
Figure 2:
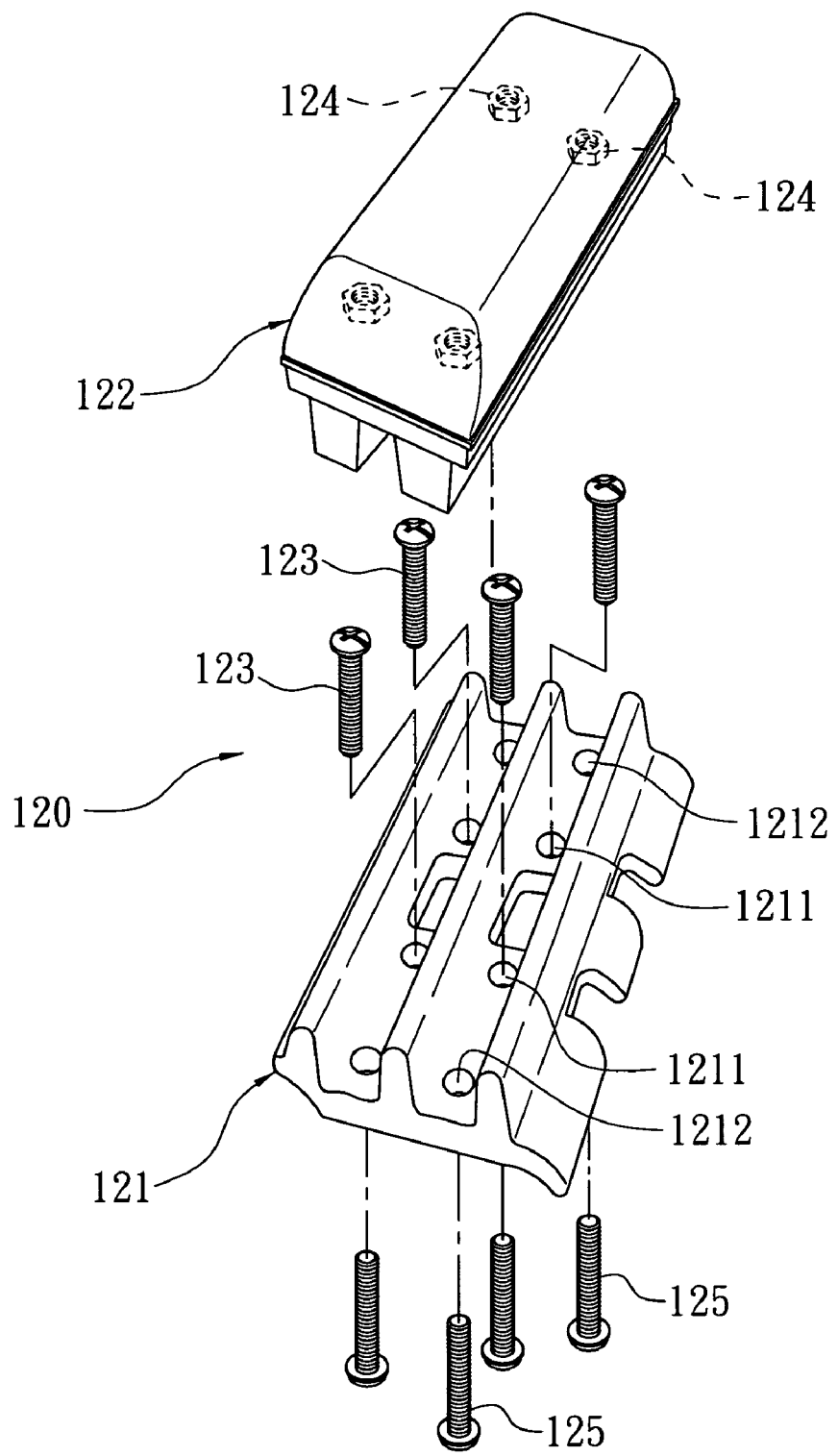
FIG. 2 is an exploded perspective view of another conventional track shoe.

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Figure 3:
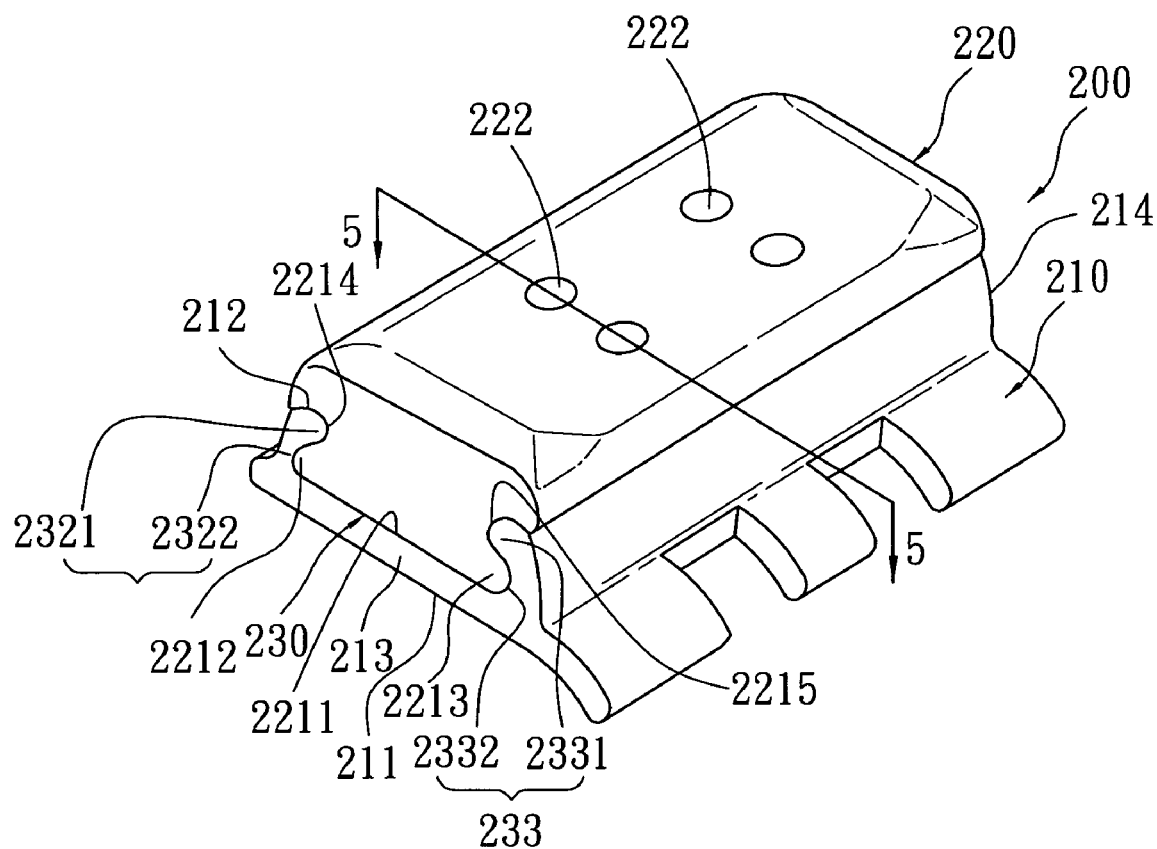
FIG. 3 is a perspective view of a track shoe for caterpillar vehicle of the first embodiment in accordance with the present invention.
Figure 5:
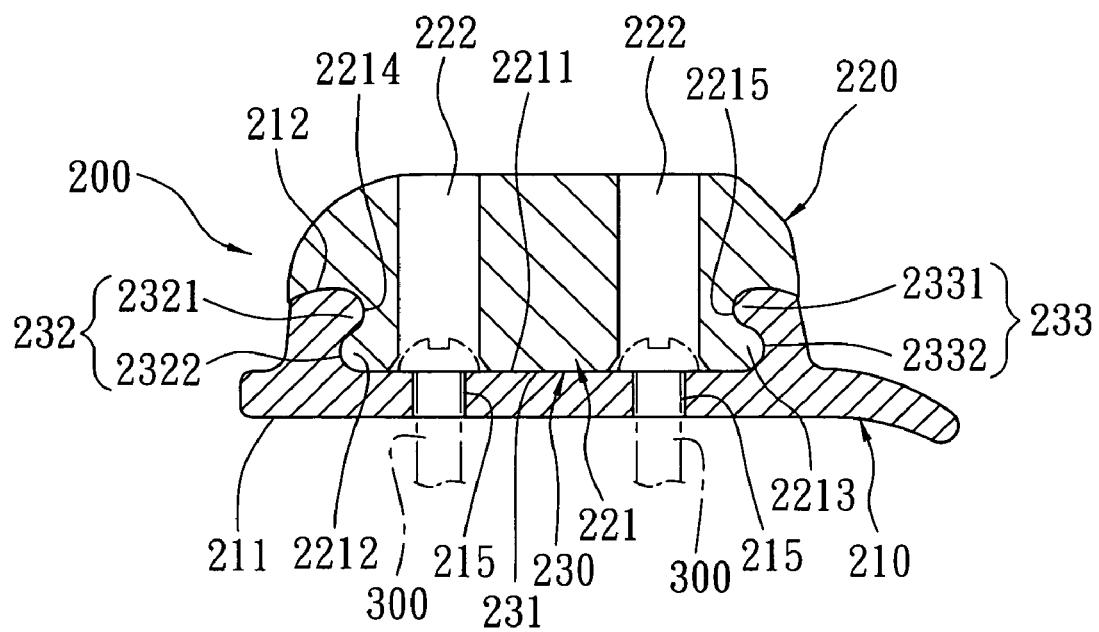
FIG. 5 is a sectional view along the section line 5-5 in FIG. 3.

Refer to FIG. 3 and FIG. 5. FIG. 3 illustrates a perspective view of a track shoe for caterpillar vehicle of the first embodiment in accordance with the present invention. FIG. 5 illustrates a sectional view along the section line 5-5 in FIG. 3. The track shoe 200 is fastened on a chain of the caterpillar vehicle, and includes a body 210 and a buffer block 220.

The body 210 is made of metal, and comprises a first surface 211, a second surface 212, a third surface 213, a fourth surface 214, a groove 230, and multiple holes 215. The first surface 211 is adjacent to the chain, and the second surface 212 is opposite the first surface 211. The groove 230 is on the second surface 212, and through the third surface 213 and the fourth surface 214. The holes 215 penetrate the first surface 211 and the second surface 212 to communicate with the groove 230.

The groove 230 includes a bottom 231, a first sidewall 232, and a second sidewall 233. The first sidewall 232 and the second sidewall 233 respectively include a protrusion 2321 and 2331, and an indentation 2322 and 2332. The indentations 2322 and 2332 are placed between the bottom 231 and the protrusions 2321 and 2331.

Figure 4:
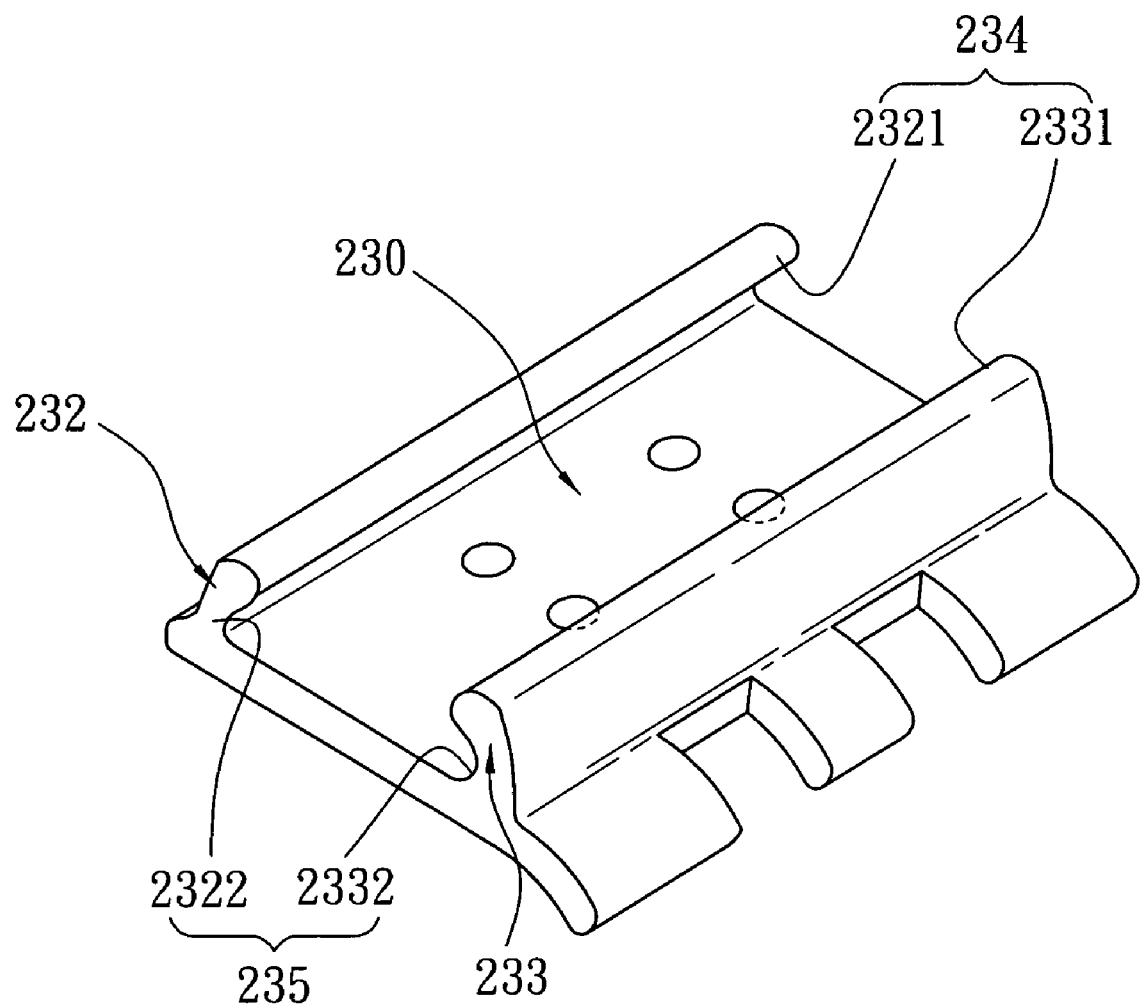
FIG. 4 is a perspective view of a body of the track shoe in FIG. 3.

Refer to FIG. 4. The protrusion 2321 of the first sidewall 232 faces the protrusion 2331 of the second sidewall 233 to define a narrow gap 234. The indentation 2322 of the first sidewall 232 faces the indentation 2332 of the second sidewall 233 to define a relatively wide gap 235. The protrusion 2321 and the protrusion 2331 of the first sidewall 232 and the second sidewall 233 are curved protrusions. The indentation 2322 and the indentation 2332 of the first sidewall 232 and the second sidewall 233 are curved indentations.

Refer to FIG. 3 and FIG. 5. The buffer block 220 is made of rubber material, and includes an embedded portion 221 and multiple lock holes 222 corresponding to the holes 215 of the body 210. The embedded portion 221 has a configuration complementary to the groove 230 such that the embedded portion 221 is capable of being embedded within the groove 230. The embedded portion 221 includes a first flank corresponding to the first sidewall 232, a second flank corresponding to the second sidewall 233, and a contact surface 2211 capable of being located against the bottom 231 of the groove 230. The first flank includes a first bulge 2212 and a first notch 2214, and the second flank includes a second bulge 2213 and a second notch 2215. The first bulge 2212 and the first notch 2214 of the first flank are embedded with the indentation 2322 and the protrusion 2321 of the first sidewall 232. The second bulge 2213 and the second notch 2215 of the second flank are embedded with the indentation 2332 and the protrusion 2331 of the second sidewall 233.

The lock holes 222 are defined through the buffer block 220 to respectively communicate with the holes 215 of the body 210. Therefore, the buffer block 220 is secured on the body 210 through not only the embedment between the flanks and the sidewalls but also the bolt connection of the fastening members 300 firmly located through the holes 215 and the lock holes 222.

In addition, the protrusion 2321 (2331) and the indentation 2322 (2332) of the sidewall 232 (233) has an S-shaped section as a view as a whole, and the bulge 2212 (2213) and the notch 2214 (2215) of the flank has a reverse S-shaped section as viewed as a whole. Consequently, the connection between the buffer block 220 and the body 210 is enhanced through the embedment of the complementary S-shaped formations. Moreover, the curved protrusion 2331 of the second sidewall 233 is smaller than the curved protrusion 2321 of the first sidewall 232 for the convenience of the buffer block 220 replacement.

Figure 6:
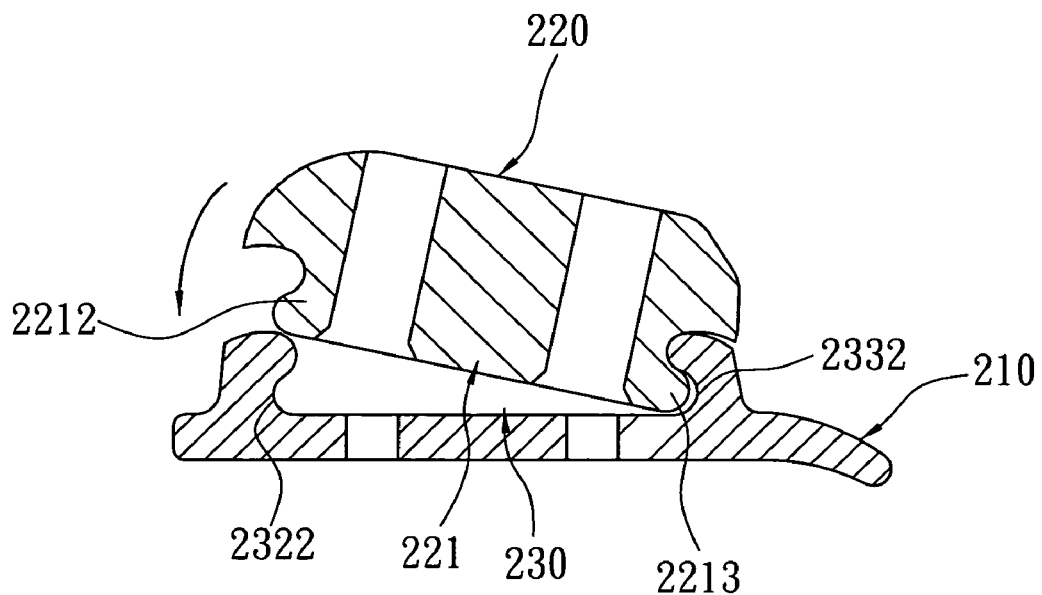
FIG. 6 is a sectional view showing the assembly between the buffer block and the body.

Refer to FIG. 6. With regard to the assembly, the discrete buffer block 220 is firstly inclined such that the second bulge 2213 of the embedded portion 221 is directed into the indentation 2332 of the body 210. The buffer block 220 is, then, pressed toward the arrow direction whereby the first bulge 2212 of the buffer block 220 is completely embedded within the first indentation 2322 of the groove 232 through the rubber elasticity. By this connection structure, the outside grits cannot pass through the junction between the body 210 and the buffer block 220.

On the other hand with regard to separation, the buffer block 220 can be demounted by inserting the tool into the junction to lever the buffer block 220 out of the groove 230 of the body 210.

The track shoe 200 is more convenient for the assembly and the separation for the buffer block 220 replacement through the simple embedment between the embedded portion 221 of the buffer block 220 and the grove 230 of the body 210. Therefore, the demountable problem of conventional track shoe is solved thereby facilitating the assembly process.

Figure 7:
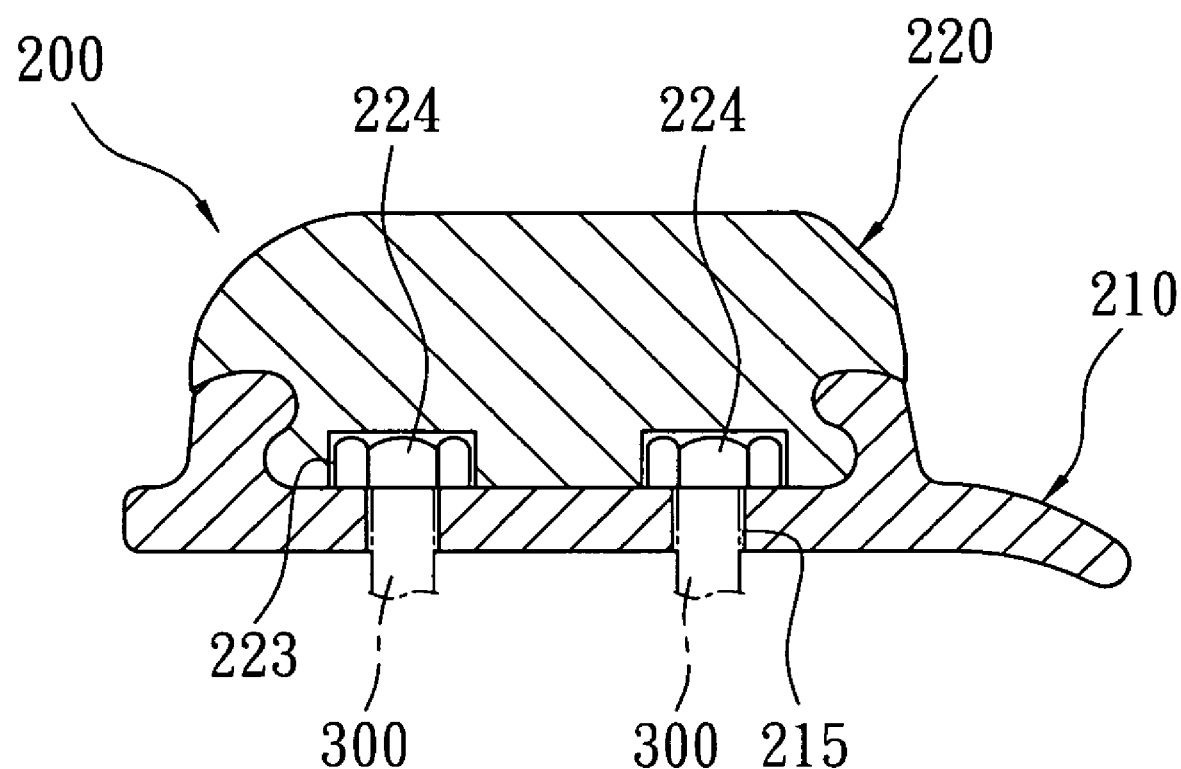
FIG. 7 is a sectional view of a track shoe for caterpillar vehicle of the second embodiment in accordance with the present invention.

Refer to FIG. 7. FIG. 7 illustrates a sectional view of a track shoe for caterpillar vehicle of the second embodiment in accordance with the present invention. The difference between the first embodiment and the second embodiment is that the lock holes 223 of the buffer block 220 are blind holes wherein the nuts 224 are pre-set within the blind holes.

As the state structure, the track shoe 200 is secured on the chain by setting the fastening members 300 through the holes 215 and the lock holes 223 to provide a bolt connection between the fastening members 300 and the nuts 224.

As embodied and broadly described herein, the buffer block 220 is embedded within the body 210 through the elasticity thereof such that the assembly or the replacement can be operated more conveniently because of its simple structure. As a result, the assembly and replacement process are facilitated and the manufacture and material cost are accordingly reduced.

Although the present invention has been described in considerable detail with reference to certain preferred embodiments thereof, other embodiments are possible. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A track shoe for a caterpillar vehicle fastened on a chain of the caterpillar vehicle, comprising:
   a body made of metal material and comprising a first surface adjacent to the chain, a second surface opposite to the first surface, a third surface, a fourth surface opposite to the third surface, a groove on the second surface and through the third surface and the fourth surface, and multiple holes penetrating through the first surface and the second surface to communicate with the groove, wherein the groove comprises a bottom, a first sidewall, and a second sidewall, wherein the first sidewall and the second sidewall respectively comprise a protrusion, and an indentation placed between the bottom and the protrusion; and a buffer block comprising an embedded portion and multiple lock holes, wherein the embedded portion is capable of being embedded within the groove of the body, and the lock holes respectively correspond to the holes of the body.

2. The track shoe of claim 1, wherein each protrusion is a curved protrusion, and each indentation is a curved indentation.

3. The track shoe of claim 1, wherein the embedded portion comprises a first flank, a second flank opposite to the first flank, and a contact surface capable of being located against the bottom of the groove wherein the first flank corresponds to the first sidewall, and the second flank corresponds to the second sidewall.

4. The track shoe of claim 3, wherein the first flank and the second flank respectively comprise a bulge and a notch, wherein the bulge and the notch of the first flank are embedded with the indentation and the protrusion of the first sidewall, and the bulge and the notch of the second flank are embedded with the indentation and the protrusion of the second sidewall.

5. The track shoe of claim 1, wherein the lock holes of the buffer block are defined completely through the buffer block.

6. The track shoe of claim 1, wherein the lock holes of the buffer block are blind holes.

7. The track shoe of claim 6, wherein the buffer block comprises multiple nuts set respectively within the blind holes.

8. The track shoe of claim 1, wherein the buffer block is made of rubber material.

* * * * *